United States Patent
Kiel et al.

(10) Patent No.: US 9,292,414 B2
(45) Date of Patent: Mar. 22, 2016

(54) SYSTEM, METHOD, AND COMPUTER PROGRAM PRODUCT FOR DEBUGGING GRAPHICS PROGRAMS LOCALLY UTILIZING A SYSTEM WITH A SINGLE GPU

(71) Applicant: NVIDIA Corporation, Santa Clara, CA (US)

(72) Inventors: Jeffrey T. Kiel, Raleigh, NC (US); Thomas H. Klein, Roetgen (DE)

(73) Assignee: NVIDIA Corporation, Santa Clara, CA (US)

( * ) Notice: Subject to any disclaimer, the term of this patent is extended or adjusted under 35 U.S.C. 154(b) by 134 days.

(21) Appl. No.: 14/076,105

(22) Filed: Nov. 8, 2013

(65) Prior Publication Data

US 2014/0146062 A1    May 29, 2014

Related U.S. Application Data

(60) Provisional application No. 61/730,025, filed on Nov. 26, 2012.

(51) Int. Cl.
| | |
|---|---|
| *G06T 1/00* | (2006.01) |
| *G06T 15/00* | (2011.01) |
| *G06F 15/00* | (2006.01) |
| *G06F 11/36* | (2006.01) |

(52) U.S. Cl.
CPC .......... *G06F 11/3636* (2013.01); *G06F 11/362* (2013.01); *G06F 11/3664* (2013.01)

(58) Field of Classification Search
None
See application file for complete search history.

(56) References Cited

U.S. PATENT DOCUMENTS

| | | | |
|---|---|---|---|
| 6,693,638 B1 | 2/2004 | An et al. | |
| 7,380,235 B1 * | 5/2008 | Fathalla | 717/109 |
| 8,572,573 B2 | 10/2013 | Baliga et al. | |
| 2005/0108689 A1 | 5/2005 | Hooper et al. | |
| 2007/0005323 A1 * | 1/2007 | Patzer et al. | 703/14 |
| 2009/0219288 A1 * | 9/2009 | Heirich | 345/426 |
| 2010/0211933 A1 * | 8/2010 | Kiel et al. | 717/125 |
| 2010/0328321 A1 | 12/2010 | Cormack et al. | |

FOREIGN PATENT DOCUMENTS

| | | |
|---|---|---|
| CN | 1666182 A | 9/2005 |
| TW | 200937189 A | 9/2009 |

OTHER PUBLICATIONS

Strengert, M. et al., "A Hardware-Aware Debugger for the OpenGL Shading Language," Graphics Hardware, 2007, pp. 1-9.
Office Action from Taiwan Patent Application No. 102142093, dated Oct. 8, 2015.
Office Action from Chinese Patent Application No. 201310611924.0, dated Dec. 17, 2015.

* cited by examiner

*Primary Examiner* — Jacinta M Crawford
(74) *Attorney, Agent, or Firm* — Zilka-Kotab, PC

(57) ABSTRACT

A system, method, and computer program product are provided for debugging graphics programs via a system with a single graphics processing unit. The method includes the steps of storing an initial state of an application programming interface context in a memory, intercepting a stream of API commands associated with the frame, transmitting the stream of API commands to a software layer that implements the API to render the frame, and in response to a breakpoint, storing a graphics processing unit context in the memory. The initial state of the API context corresponds to the start of a frame, and the stream of API commands are generated by a graphics application.

17 Claims, 12 Drawing Sheets

```
Shader 700
1    void main (void) {
2
3        vec3 p[16];
4        for(int i = 0; i < 4; i++) {
5            p[4*i+0] = vertices[indices[gl_instanceID * 4 + i].x].xyz;
6            p[4*i+1] = vertices[indices[gl_instanceID * 4 + i].y].xyz;
7            p[4*i+2] = vertices[indices[gl_instanceID * 4 + i].z].xyz;
8            p[4*i+3] = vertices[indices[gl_instanceID * 4 + i].w].xyz;
9        }
10
11       vec2 uv = gl_vertex.xy;
12
13       vec2 B0 = (1 – uv) * (1 – uv);
14       vec2 B1 = 3 * uv * (1 – uv) * (1 – uv);
15       vec2 B2 = 3 * uv * uv * (1 – uv);
16       vec2 B3 = uv * uv * uv;
17
18       vec3 pos =
19           (B0.x * p[ 0] + B1.x * p[ 1] + B2.x * p[ 2] + B3.x * p[ 3]) * B0.y +
20           (B0.x * p[ 4] + B1.x * p[ 5] + B2.x * p[ 6] + B3.x * p[ 7]) * B1.y +
21           (B0.x * p[ 8] + B1.x * p[ 9] + B2.x * p[10] + B3.x * p[11]) * B2.y +
22           (B0.x * p[12] + B1.x * p[13] + B2.x * p[14] + B3.x * p[15]) * B3.y;
23
24       vec2 T0 = (1 – uv) * (1 – uv);
25       vec2 T1 = 2 * uv * (1 – uv);
26       vec2 T2 = uv * uv;
27
28       vec3 dv =
29           (B0.x * (p[ 4] – p[ 0]) + B1.x * (p[ 5] - p[ 1]) + B2.x * (p[ 6] – p[ 2]) + B3.x * (p[ 7] - p[ 3])) * T0.y +
30           (B0.x * (p[ 8] – p[ 4]) + B1.x * (p[ 9] - p[ 5]) + B2.x * (p[10] – p[ 6]) + B3.x * (p[11] - p[ 7])) * T1.y +
31           (B0.x * (p[12] – p[ 8]) + B1.x * (p[13] - p[ 9]) + B2.x * (p[14] – p[10]) + B3.x * (p[15] - p[11])) * T2.y;
32
33       vec3 du =
34           (T0.x * (p[ 1] – p[ 0]) + T1.x * (p[ 2] - p[ 1]) + T2.x * (p[ 3] – p[ 2])) * B0.y +
35           (T0.x * (p[ 5] – p[ 4]) + T1.x * (p[ 6] - p[ 5]) + T2.x * (p[ 7] – p[ 6])) * B1.y +
36           (T0.x * (p[ 9] – p[ 8]) + T1.x * (p[10] - p[ 9]) + T2.x * (p[11] – p[10])) * B2.y +
37           (T0.x * (p[13] – p[12]) + T1.x * (p[14] - p[13]) + T2.x * (p[15] – p[14])) * B3.y;
38
39
40       gl_Position = gl_ModelViewProjectionMatrix * vec4(pos, 1.0);
41       vec3 nor = cross(du, dv);
42       nor = (length(nor) != 0) ? Normalize(nor) : vec3(0.0);
43       v_Normal = gl_NormalMatrix * nor;
44   }
```

*Fig. 7A*

SYSTEM, METHOD, AND COMPUTER
PROGRAM PRODUCT FOR DEBUGGING
GRAPHICS PROGRAMS LOCALLY
UTILIZING A SYSTEM WITH A SINGLE GPU

CLAIM OF PRIORITY

This application claims the benefit of U.S. Provisional Application No. 61/730,025, filed Nov. 26, 2012, the entire contents of which are incorporated herein by reference.

FIELD OF THE INVENTION

The present invention relates to software design, and more particularly to the debugging of graphics programs.

BACKGROUND

Programmer's today have become accustomed to being able to create and debug programs via a plethora of tools implemented in today's Integrated Development Environments (IDEs) such as Microsoft® Visual Studio. A programmer may create source code for a program to be executed by a target processor, compile the source code to generate an executable file, and run the executable file on the target processor. The IDE may include tools that allow the programmer to execute the program using breakpoints, step through the program one instruction at a time, step through the program from breakpoint to breakpoint, and view the contents of memory or registers at different points during the program's execution.

Typically, the target processor may be a central processing unit (CPU) such as the Intel® x86 family of processors or the ARM® Cortex family of processors that include a RISC (Reduced Instruction Set Computing) based CPU core. Such processors may be implemented with the ability to interrupt or pre-empt the execution of certain code executed by the processor. This ability enables a programmer to debug programs via a single processor that is also used to execute the operating system (OS), IDE, or other software substantially simultaneously. However, today's conventional graphics processing units (GPUs) may not be capable of operating in this fashion. For example, conventional GPUs may not enable pre-emption for specific processes executing on the GPU. In other words, the programmer cannot halt the execution of a program on the GPU while allowing other operations, such as generating graphics information for display on an attached monitor, to continue to be executed. Without such capabilities, debugging platforms for GPUs are typically limited to remote systems having a GPU connected to a client system over a network or local systems with multiple GPUs, where one GPU is dedicated to display operations and the other GPU is dedicated to debugging operations. Such systems are more complex to setup and operate, requiring extra hardware and special configuration. It would be useful for programmers to be able to code on single-GPU systems, which are abundantly available on most desktop and laptop computers. Thus, there is a need for addressing this issue and/or other issues associated with the prior art.

SUMMARY

A system, method, and computer program product are provided for debugging graphics programs via a system with a single graphics processing unit. The method includes the steps of storing an initial state of an application programming interface context in a memory, intercepting a stream of API commands associated with the frame, transmitting the stream of API commands to a software layer that implements the API to render the frame, and in response to a breakpoint, storing a graphics processing unit context in the memory. The initial state of the API context corresponds to the start of a frame, and the stream of API commands are generated by a graphics application.

BRIEF DESCRIPTION OF THE DRAWINGS

FIG. 7A illustrates a portion of code for a shader program, in accordance with one embodiment;

DETAILED DESCRIPTION

The present disclosure describes a mechanism for debugging graphics programs on a system having a single GPU. An application shim is configured to intercept API commands generated by a graphics application executed by a host processor. The graphics application, when compiled, is configured to generate API commands transmitted to a software layer that implements the API, such as a driver or runtime library. The instructions configured to generate the API commands for the software layer may be replaced with instructions configured to generate the API commands for the application shim. The instructions may be replaced automatically in the binary code by a software tool or manually by linking the application shim to the source code for the graphics application. When the graphics application is executed, the API commands are routed to the application shim instead of the software layer.

The application shim is configured to track an API context associated with the graphics application. The API context may be tracked by creating and modifying a state model that represents the current API context. The application shim is configured to update the state model based on the API commands received from the graphics application. After the state model is updated, the application shim may forward the API commands to the software layer, as originally intended by the graphics application.

The application shim may be configured to implement a replay mechanism that allows a debugging tool to implement various debugging techniques commonly associated only with conventional CPUs. The replay mechanism includes the steps of storing an initial state of the API context at the start of rendering a frame of image data for display, storing a stream of API commands generated by the graphics application for the frame of image data in a replay buffer, and initiating a replay loop to repeatedly render the frame of image data a number of times. Each pass of the replay loop comprises restoring the API context to match the initial state of the API context and transmitting the stream of API commands in the replay buffer to the software layer. When a breakpoint is encountered during the replay loop, a current state of the GPU context may be captured during the rendering of the frame. Using the replay mechanism described above, a debugging tool may allow a programmer to stop at a breakpoint in the program, step through the program one instruction at a time, step through the program one breakpoint at a time, and so forth on a system with a single GPU without freezing the display.

Figure 1:
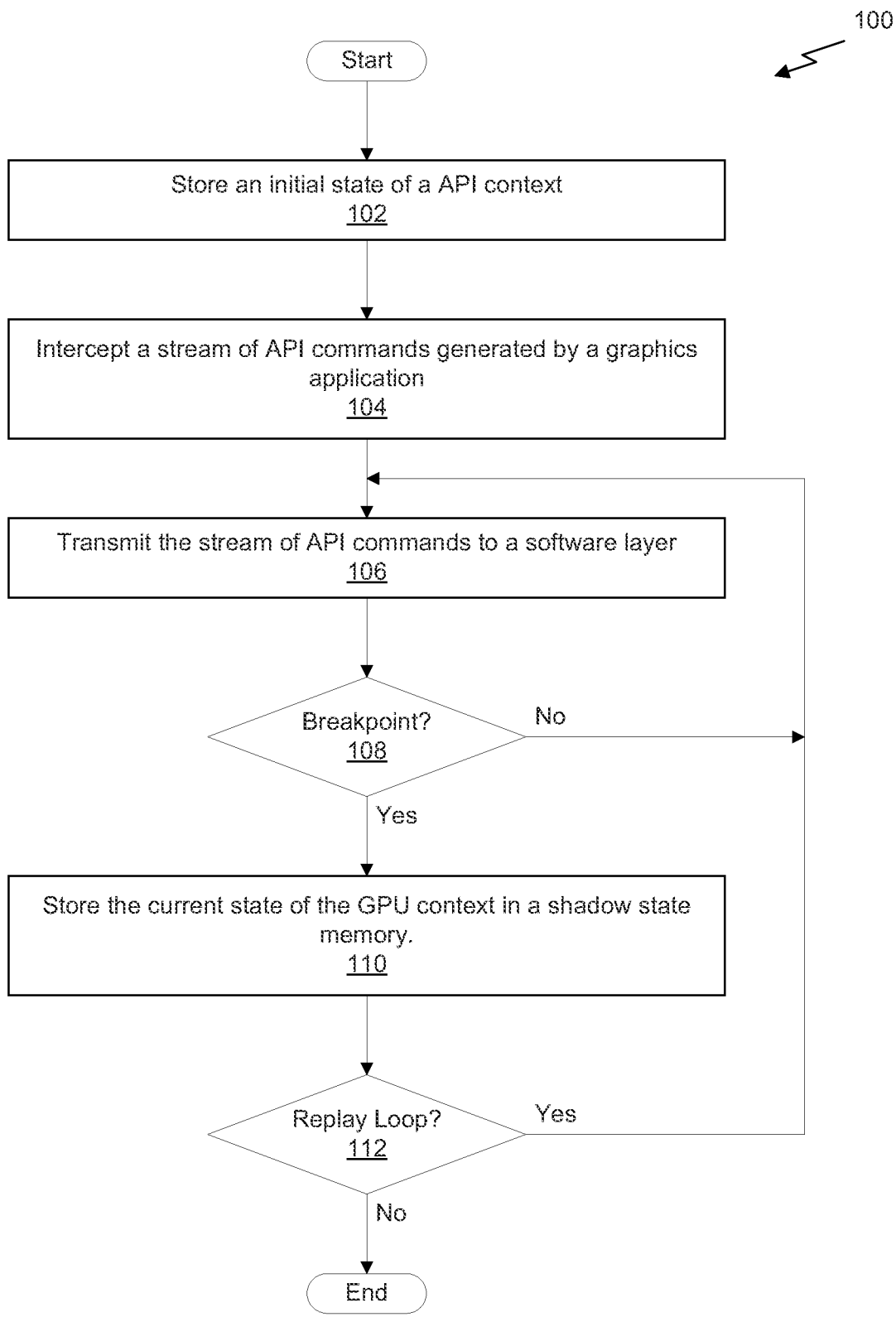
FIG. 1 illustrates a flowchart of a method for debugging graphics programs utilizing a system having a single graphics processing unit, in accordance with one embodiment.

FIG. 1 illustrates a flowchart of a method 100 for debugging graphics programs utilizing a system having a single GPU, in accordance with one embodiment. At step 102, an initial state of an API context is stored in a memory. The initial state of the API context may correspond to information included in a state model that represents the API context at the start of a frame. The initial state of the API context is copied into a separate data structure in memory in order to reset the state of the API context at a later point in time. At step 104, a stream of API commands generated by a graphics application is intercepted. The stream of API commands may be stored in a replay buffer. Multiple API contexts may exist at any given point in time, and each API context may be associated with one or more streams of API commands generated by a graphics application. In one embodiment, two or more streams of API commands associated with the API context are stored in the replay buffer. In the context of the present description, a replay buffer is any data structure allocated in the memory and configured to store an ordered list of API commands. In one embodiment, the replay buffer is a linked list. In another embodiment, the replay buffer is a FIFO.

At step 106, the stream of API commands is transmitted to a software layer. In one embodiment, the software layer may be a driver that implements the API, such as a driver that implements the OpenGL API. In another embodiment, the software layer may be a runtime library that implements the API, such as a runtime library that implements the Direct3D API. In such embodiments, the software layer may be linked to another driver or other intermediate layer. At step 108, an application shim determines whether a breakpoint has been reached. In the context of the present disclosure a breakpoint is a special instruction executed by a processor that causes execution to be halted and, potentially, a fault handler or other routine to be executed. A breakpoint may be a special instruction or associated with another instruction (such as an instruction prefix) that indicates the instruction is associated with a breakpoint in the program. In one embodiment, the breakpoint (either directly or indirectly through a fault handler) may cause the GPU to transmit a message to the driver that indicates the breakpoint has been reached and the GPU has halted execution of further instructions. If no breakpoint has been reached, then the method 800 returns to step 106 where additional API commands are transmitted to the software layer. However, returning to step 108, in response to reaching a breakpoint, the method 800 proceeds to step 110, where a current state of the GPU context is stored in a memory. At step 112, a replay loop is initiated, which causes the initial state of the API context to be restored, the stream of API commands to be re-transmitted to the software layer, and another state of the GPU context to be stored in the memory.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
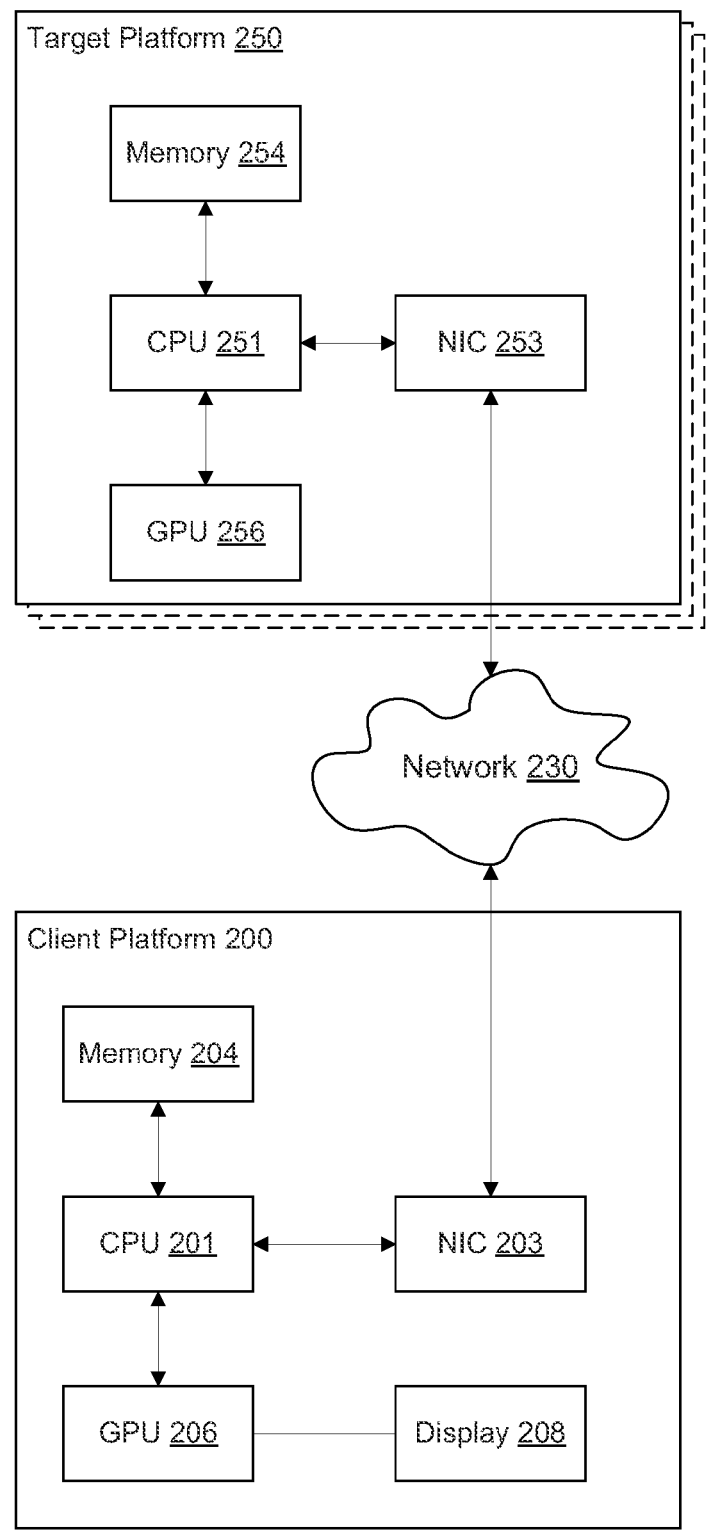
FIG. 2 illustrates a system configured to debug graphics programs, according to the prior art.

FIG. 2 illustrates a system configured to debug graphics programs, according to the prior art. As shown in FIG. 2, the system includes a client platform 200 coupled to a target platform 250 via a network 230. The client platform 200 may be, e.g., a desktop computer, a laptop computer, a tablet computer, or any other system configured to run an IDE or other debugging software. The client platform 200 includes a central processing unit (CPU) 201, a memory 204, a GPU 206, a display device 208, and a network interface controller (NIC) 203. The CPU 201 may be an x86 type processor, a RISC processor, a PowerPC processor or the like. The memory 204 may be a volatile memory such as a dynamic random access memory (DRAM). Although not explicitly shown, the client platform 200 may include a non-volatile storage device such as a hard-disk drive (HDD) or other type of magnetic or optical storage system. The NIC 203 may implement a TCP/IP protocol for connecting to one or more other devices through the network 230, which may be, e.g., a local area network (LAN), a wide area network (WAN), the Internet, or the like. The display device 208 may be a liquid crystal display (LCD) device, an organic light emitting diode (OLED) display device, a cathode ray tube (CRT) display device, or the like.

The GPU 206 is a processor that implements a programmable, parallel processing architecture that includes at least a portion of an image processing pipeline. The image processing pipeline is configured to generate image data for display on the display device 208, which may be connected to the GPU 206 via any type of communications link such as a Video Graphics Array (VGA) connection, a High-Definition Multimedia Interface (HDMI) connection, a DisplayPort (DP) connection, or the like. Although not shown explicitly, the GPU 206 may be connected to a local graphics memory such as a synchronous dynamic random access memory (SDRAM) or the like. The GPU 206 may be configured to generate frames of image data based on commands transmitted to the GPU 206 from a driver executed by the CPU 201. The frames of image data may be stored in a frame buffer in the local graphics memory and converted to video signals transmitted to the display device 208 via the communications link.

The target platform 250 may be, e.g., another desktop computer connected to the network 230 and including a second CPU 251, a second GPU 256, a second memory 254, and a second NIC 253. The CPU 251, memory 254, and NIC 253 may be similar to the CPU 201, memory 204, and NIC 203 described above. The second GPU 256 may be referred to as a target device. A development application such as an IDE or other type of debugging tool may be executed by the client platform 200. The development application may cause a graphics program (i.e., a shader) to be executed by the GPU 256, implementing such debugging mechanisms as breakpoints, instruction stepping, and the like through the development application executed on the client platform 200. It will be appreciated that the target platform 250 may not include a display device attached to the GPU 256 because, during debugging, the GPU 256 may be halted, thereby preventing the GPU 256 from generating display signals for the display device. However, the programmer may be able to view the state of the GPU 256 on the display device 208 of the client platform 200 because the GPU 206 is not halted during debugging and is, therefore, capable of generating display signals for the display device 208.

This type of remote system used for debugging of graphics programs may be sufficient for certain situations such as where a programmer is utilizing a client platform 200 setup at a central office and connected to one or more target platforms 250 via a local area network. However, this system requires additional hardware adding unnecessary expense and is complex to setup, requiring the programmer or a network manager to configure the various IP addresses of the target platforms 250 and configure the development application accordingly. Many times programmers will only have access to a conventional system (such as a desktop computer or laptop computer) that only includes a single GPU, and the programmers may not have access to a target platform connected to a network.

It will be appreciated that an alternative system may be constructed that incorporates multiple GPUs in a single platform, where at least one GPU may be dedicated to generating image data for display and at least one other GPU is dedicated to debugging operations. This type of system has been used for debugging compute applications for General Purpose computing on Graphics Processing Units (GPGPU). However, such systems require a separate driver for the GPU dedicated to debugging operations that prevents the GPU dedicated to debugging operations from processing graphics programs. In other words, conventional operating systems such as Microsoft® Windows are configured to allocate graphics operations to any of the available GPUs configured to process graphics programs. Therefore, the development application cannot halt operation of a graphics program for debugging purposes without potentially stalling the ability of the operating system to display image data produced by the operating system or other applications. Such issues may be alleviated utilizing the system described below.

Figure 3:
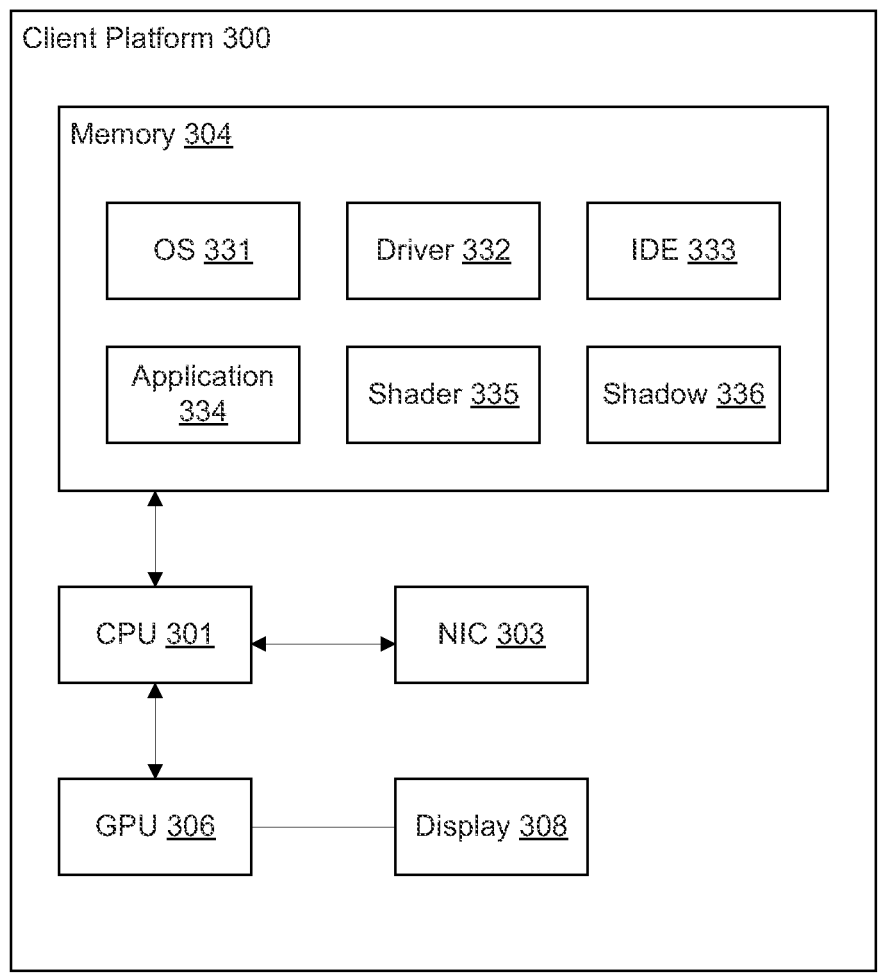
FIG. 3 illustrates a system configured to debug graphics programs, in accordance with one embodiment.

FIG. 3 illustrates a system configured to debug graphics programs, in accordance with one embodiment. As shown in FIG. 3, a client platform 300 is similar to the client platform 200 in that the client platform 300 includes a CPU 301, a memory 304, a GPU 306, a display device 308, and a NIC 303. In one embodiment, these components are similar to the components of the client platform 200. The memory 304 may include an operating system (OS) 331, a driver 332, an IDE 333, a graphics application 334, one or more shader programs 335, and a shadow state memory 336. The OS 331 may be Microsoft® Windows, Linux®, Mac® OSX, or the like. The IDE 333 may be Microsoft® Visual Studio, NVIDIA® Nsight (an extension for Visual Studio), the open source Eclipse Platform, or any other type of development environment or debugging software capable of debugging graphics programs.

The driver 332 is configured to transmit instructions to the GPU 306 in order to execute tasks on the GPU 306. In one embodiment, the driver 332 implements an API defined by the OpenGL® specification. The API enables the graphics application 334 to generate hardware-independent API commands that are sent to the driver 332, which in turn causes the GPU 306 to perform operations specified by the API commands. In another embodiment, the driver 332 implements an API associated with a runtime library that implements the Direct3D®API. The API enables the graphics application 334 to generate hardware-independent API commands that are sent to the runtime library, which in turn transmits additional API commands to the driver 332 that causes the GPU 306 to execute instructions specified by the API commands. It will be appreciated that API commands generated by the graphics application 334 may be transmitted to the driver 332, either directly or indirectly, through one or more intermediate software layers such as application shims, libraries, etc.

The graphics application 334 may be a software application configured to be executed by the CPU 301 in order to generate API commands transmitted to a software layer. The graphics application 334 may be associated with one or more shader programs 335 such as a vertex shader, a geometry shader, or a fragment shader (i.e., pixel shader) that are configured to be executed by a programmable program unit of the GPU 306. A shader is a generic term for a set of instructions configured to be executed by a GPU for transforming geometric primitives or shading pixels (i.e., generating color component values for one or more pixels). Each shader may be configured to receive one or more input buffers (e.g., a vertex buffer, etc.) and generate one or more output buffers (e.g., a triangle patch, a color vector, etc.).

As discussed above, conventional GPUs do not have the capability to be halted during execution while continuing to produce image data for display on a display device. In order to solve this issue, an application shim is configured to replay operations specified by a graphics application such that the IDE 333 will display the state of the GPU 306 as if the GPU 306 is halted during debugging while the GPU is actually allowed to continue execution, thereby allowing the GPU context to be switched from the API context associated with the graphics application to, e.g., an API context associated with the operating system 331 that generates image data for display on the display device 308.

In one embodiment, an application shim is configured to track an API context associated with the graphics application 334. The application shim stores an initial state of the API context in the memory 304 at the start of a particular frame or frames. A programmer may utilize a debugging tool to indicate which frame(s) are of interest. The application shim stores a stream of API commands for one or more frames generated by the graphics application 334 in the memory 304. The application shim may then initiate a replay loop to repeatedly execute the stream of API commands in order to render the one or more frames of image data a number of times. In other words, a single iteration of the replay loop executes the stream of API commands in order to render the one or more frames of image data. At the end of the stream of API commands, the initial state of the API context may be restored and the stream of API commands may be replayed to repeat the operations in substantially the same order and re-render the one or more frames of image data. The API commands may include calls to load a particular shader program, calls that specify a push buffer that includes a plurality of geometric primitives (e.g., triangles), draw calls, and the like. The stream of API commands may be saved in a replay buffer in the memory 304 and then replayed over and over as many times as the user desires in order to perform debugging operations.

This replay functionality can be exploited by the IDE 333 or other debugging tools in order to implement various debugging techniques. For example, a graphics application 334 and/or shader program 335 may be debugged by executing the graphics application 334 and initiating a replay loop during a particular frame. A breakpoint (i.e., a special instruction) may be included in a shader program 335 at a certain line that causes the GPU 306 to halt execution of any further instructions associated with the graphics application 334. In one embodiment, the breakpoint instruction causes a fault handler to be executed by the GPU 306. The fault handler may cause a message to be transmitted to the application shim (e.g., via the driver 332). In one embodiment, the application shim is configured to copy the current state of the GPU context into the shadow state memory 336. Once the current state of the GPU context has been stored in the shadow state memory 336, the GPU 306 can be allowed to continue execution of the shader program 335 and any other instructions specified by the stream of API commands. Normally, allowing the GPU 306 to continue execution would prevent a programmer from inspecting the state of the GPU context (i.e., registers, associated memory constructs, etc.) because the GPU context would be updated as additional instructions are executed. However, in this case, the state of the GPU context is stored in the shadow state memory 336 and is not affected by allowing the program to continue or allowing a different context to be loaded onto the GPU 306. Thus, while the GPU 306 has moved on to other tasks, the programmer can inspect the stored information in the shadow state memory 336.

In one embodiment, the GPU 306 comprises the parallel processing unit 400 described below in conjunction with FIGS. 4 & 5. It will be appreciated that other embodiments may include a GPU with a different architecture and that such architecture shown below is for illustrative purposes.

Figure 4:
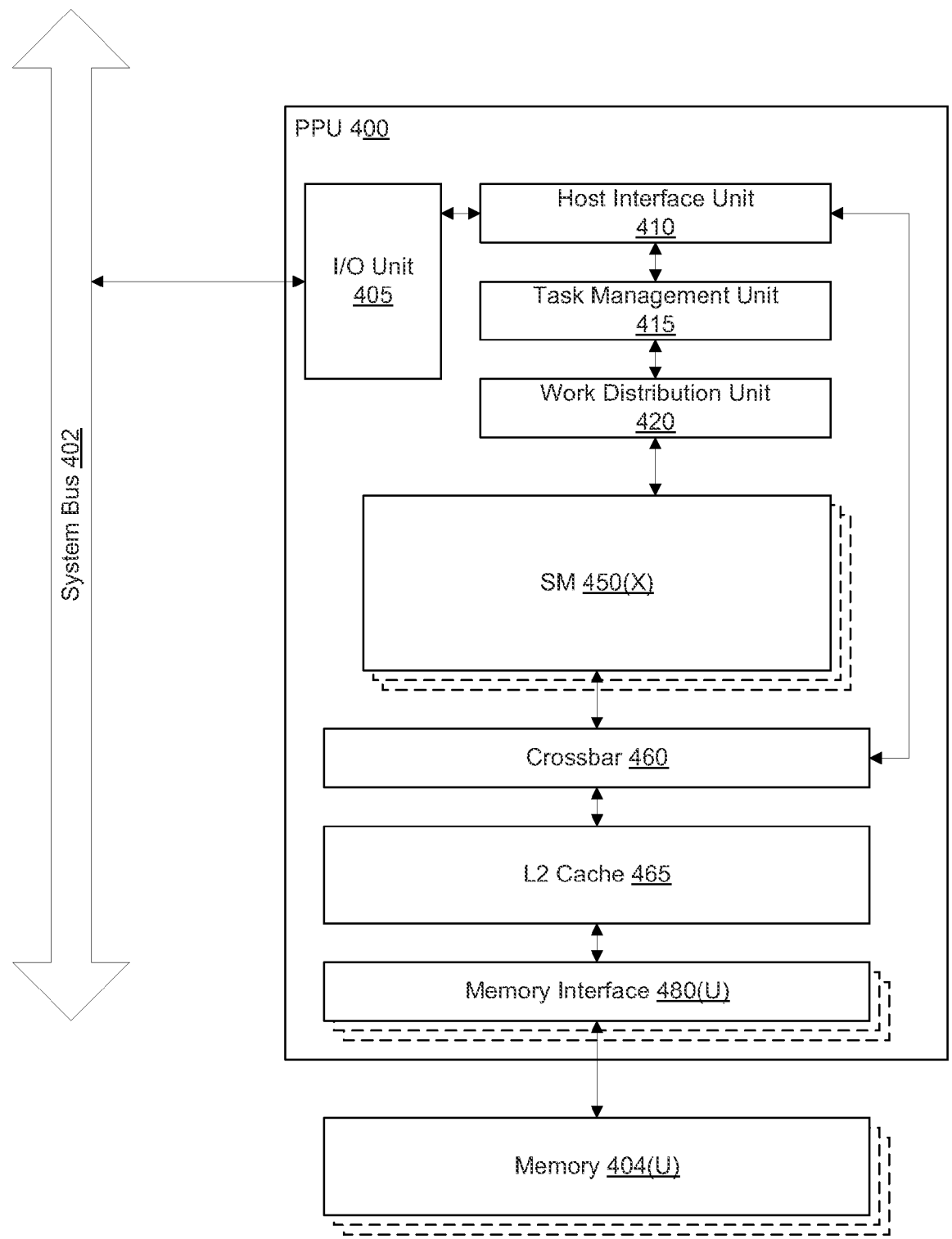
FIG. 4 illustrates a parallel processing unit, according to one embodiment.

FIG. 4 illustrates a parallel processing unit (PPU) 400, according to one embodiment. While a parallel processor is provided herein as an example of the PPU 400, it should be strongly noted that such processor is set forth for illustrative purposes only, and any processor may be employed to supplement and/or substitute for the same. In one embodiment, the PPU 400 is configured to execute a plurality of threads concurrently in two or more streaming multi-processors (SMs) 450. A thread (i.e., a thread of execution) is an instantiation of a set of instructions executing within a particular SM 450. Each SM 450, described below in more detail in conjunction with FIG. 5, may include, but is not limited to, one or more processing cores, one or more load/store units (LSUs), a level-one (L1) cache, shared memory, and the like.

In one embodiment, the PPU 400 includes an input/output (I/O) unit 405 configured to transmit and receive communications (i.e., commands, data, etc.) from a central processing unit (CPU) (not shown) over the system bus 402. The I/O unit 405 may implement a Peripheral Component Interconnect Express (PCIe) interface for communications over a PCIe bus. In alternative embodiments, the I/O unit 405 may implement other types of well-known bus interfaces.

The PPU 400 also includes a host interface unit 410 that decodes the commands and transmits the commands to the task management unit 415 or other units of the PPU 400 (e.g., memory interface 480) as the commands may specify. The host interface unit 410 is configured to route communications between and among the various logical units of the PPU 400.

In one embodiment, a program encoded as a command stream is written to a buffer by the CPU. The buffer is a region in memory, e.g., memory 404 or system memory, that is accessible (i.e., read/write) by both the CPU and the PPU 400. The CPU writes the command stream to the buffer and then transmits a pointer to the start of the command stream to the PPU 400. The host interface unit 410 provides the task management unit (TMU) 415 with pointers to one or more streams. The TMU 415 selects one or more streams and is configured to organize the selected streams as a pool of pending grids. The pool of pending grids may include new grids that have not yet been selected for execution and grids that have been partially executed and have been suspended.

A work distribution unit 420 that is coupled between the TMU 415 and the SMs 450 manages a pool of active grids, selecting and dispatching active grids for execution by the SMs 450. Pending grids are transferred to the active grid pool by the TMU 415 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 420. In addition to receiving grids from the host interface unit 410 and the work distribution unit 420, the TMU 415 also receives grids that are dynamically generated by the SMs 450 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 400. An application may include instructions (i.e., API commands) that cause the driver kernel to generate one or more grids for execution. In one embodiment, the PPU 400 implements a SIMD (Single-Instruction, Multiple-Data) architecture where each thread block (i.e., warp) in a grid is concurrently executed on a different data set by different threads in the thread block. The driver kernel defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may exchange data through global memory.

In one embodiment, the PPU 400 comprises X SMs 450 (X). For example, the PPU 400 may include 15 distinct SMs 450. Each SM 450 is multi-threaded and configured to execute a plurality of threads (e.g., 32 threads) from a particular thread block concurrently. Each of the SMs 450 is connected to a level-two (L2) cache 465 via a crossbar 460 (or other type of interconnect network). The L2 cache 465 is connected to one or more memory interfaces 480. Memory interfaces 480 implement 16, 32, 64, 128-bit data buses, or the like, for high-speed data transfer. In one embodiment, the PPU 400 comprises U memory interfaces 480(U), where each memory interface 480(U) is connected to a corresponding memory device 404(U). For example, PPU 400 may be connected to up to 6 memory devices 404, such as graphics double-data-rate, version 5, synchronous dynamic random access memory (GDDR5 SDRAM).

In one embodiment, the PPU 400 implements a multi-level memory hierarchy. The memory 404 is located off-chip in SDRAM coupled to the PPU 400. Data from the memory 404 may be fetched and stored in the L2 cache 465, which is located on-chip and is shared between the various SMs 450. In one embodiment, each of the SMs 450 also implements an L1 cache. The L1 cache is private memory that is dedicated to a particular SM 450. Each of the L1 caches is coupled to the shared L2 cache 465. Data from the L2 cache 465 may be fetched and stored in each of the L1 caches for processing in the functional units of the SMs 450.

In one embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. Attributes may include one of more of position, color, surface normal vector, texture coordinates, etc. The PPU 400 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shader, etc. For example, the TMU 415 may configure one or more SMs 450 to execute a vertex shader program that processes a number of vertices defined by the model data. In one embodiment, the TMU 415 may configure different SMs 450 to execute different shader programs concurrently. For example, a first subset of SMs 450 may be configured to execute a vertex shader program while a second subset of SMs 450 may be configured to execute a pixel shader program. The first subset of SMs 450 processes vertex data to produce processed vertex data and writes the processed vertex data to the L2 cache 465 and/or the memory 404. After the processed vertex data is rasterized (i.e., transformed from three-dimensional data into two-dimensional data in screen space) to produce fragment data, the second subset of SMs 450 executes a pixel shader to produce processed fragment data, which is then blended with other processed fragment data and written to the frame buffer in memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 400 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 400 is embodied on a single semiconductor substrate. In another embodiment, the PPU 400 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 400 may be included on a graphics card that includes one or more memory devices 404 such as GDDR5 SDRAM. The graphics card may be configured to interface with a PCIe slot on a motherboard of a desktop computer that includes, e.g., a northbridge chipset and a southbridge chipset. In yet another embodiment, the PPU 400 may be an integrated graphics processing unit (iGPU) included in the chipset (i.e., Northbridge) of the motherboard.

Figure 5:
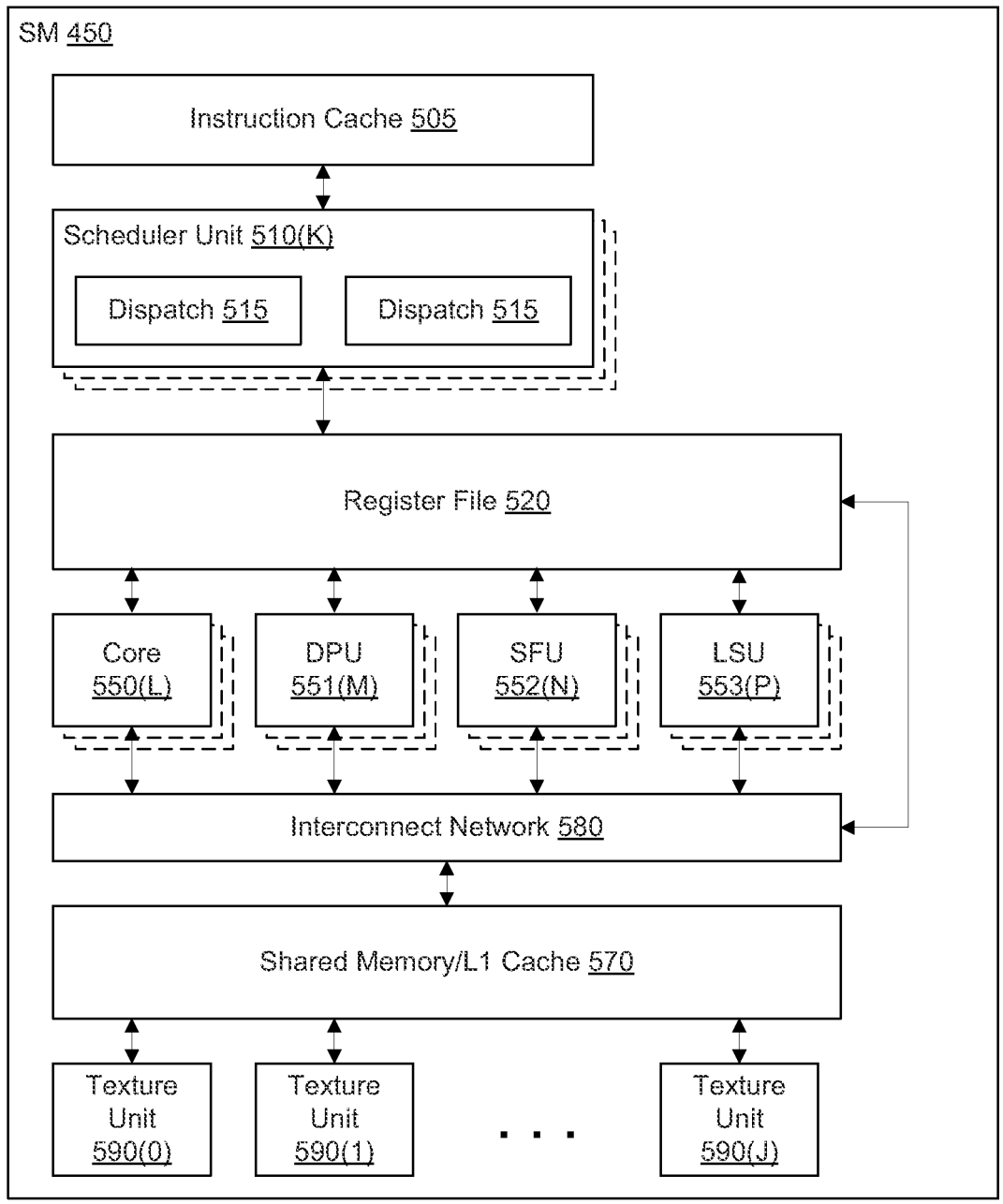
FIG. 5 illustrates the streaming multi-processor of FIG. 4, according to one embodiment.

FIG. 5 illustrates the streaming multi-processor 450 of FIG. 4, according to one embodiment. As shown in FIG. 5, the SM 450 includes an instruction cache 505, one or more scheduler units 510, a register file 520, one or more processing cores 550, one or more double precision units (DPUs) 551, one or more special function units (SFUs) 552, one or more load/store units (LSUs) 553, an interconnect network 580, a shared memory/L1 cache 570, and one or more texture units 590.

As described above, the work distribution unit 420 dispatches active grids for execution on one or more SMs 450 of the PPU 400. The scheduler unit 510 receives the grids from the work distribution unit 420 and manages instruction scheduling for one or more thread blocks of each active grid. The scheduler unit 510 schedules threads for execution in groups of parallel threads, where each group is called a warp. In one embodiment, each warp includes 32 threads. The scheduler unit 510 may manage a plurality of different thread blocks, allocating the thread blocks to warps for execution and then scheduling instructions from the plurality of different warps on the various functional units (i.e., cores 550, DPUs 551, SFUs 552, and LSUs 553) during each clock cycle.

In one embodiment, each scheduler unit 510 includes one or more instruction dispatch units 515. Each dispatch unit 515 is configured to transmit instructions to one or more of the functional units. In the embodiment shown in FIG. 5, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 450 includes a register file 520 that provides a set of registers for the functional units of the SM 450. In one embodiment, the register file 520 is divided between each of the functional units such that each functional unit is allocated a dedicated portion of the register file 520. In another embodiment, the register file 520 is divided between the different warps being executed by the SM 450. The register file 520 provides temporary storage for operands connected to the data paths of the functional units.

Each SM 450 comprises L processing cores 550. In one embodiment, the SM 450 includes a large number (e.g., 192, etc.) of distinct processing cores 550. Each core 550 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 450 also comprises M DPUs 551 that implement double-precision floating point arithmetic, N SFUs 552 that perform special functions (e.g., pixel blending operations, and the like), and P LSUs 553 that implement load and store operations between the shared memory/L1 cache 570 and the register file 520. In one embodiment, the SM 450 includes 64 DPUs 551, 32 SFUs 552, and 32 LSUs 553.

Each SM 450 includes an interconnect network 580 that connects each of the functional units to the register file 520 and the shared memory/L1 cache 570. In one embodiment, the interconnect network 580 is a crossbar that can be configured to connect any of the functional units to any of the registers in the register file 520 or the memory locations in shared memory/L1 cache 570.

In one embodiment, the SM 450 is implemented within a GPU. In such an embodiment, the SM 450 comprises J texture units 590. The texture units 590 are configured to load texture maps (e.g., a 2D array of texels) from the memory 404 and sample the texture maps to produce sampled texture values for use in shader programs. The texture units 590 implement texture operations such as anti-aliasing operations using mipmaps (i.e., texture maps of varying levels of detail). In one embodiment, the SM 450 includes 16 texture units 590.

The PPU 400 described above may be configured to perform highly parallel computations much faster than conventional CPUs. Parallel computing has advantages in graphics processing, data compression, biometrics, stream processing algorithms, and the like.

Figure 6:
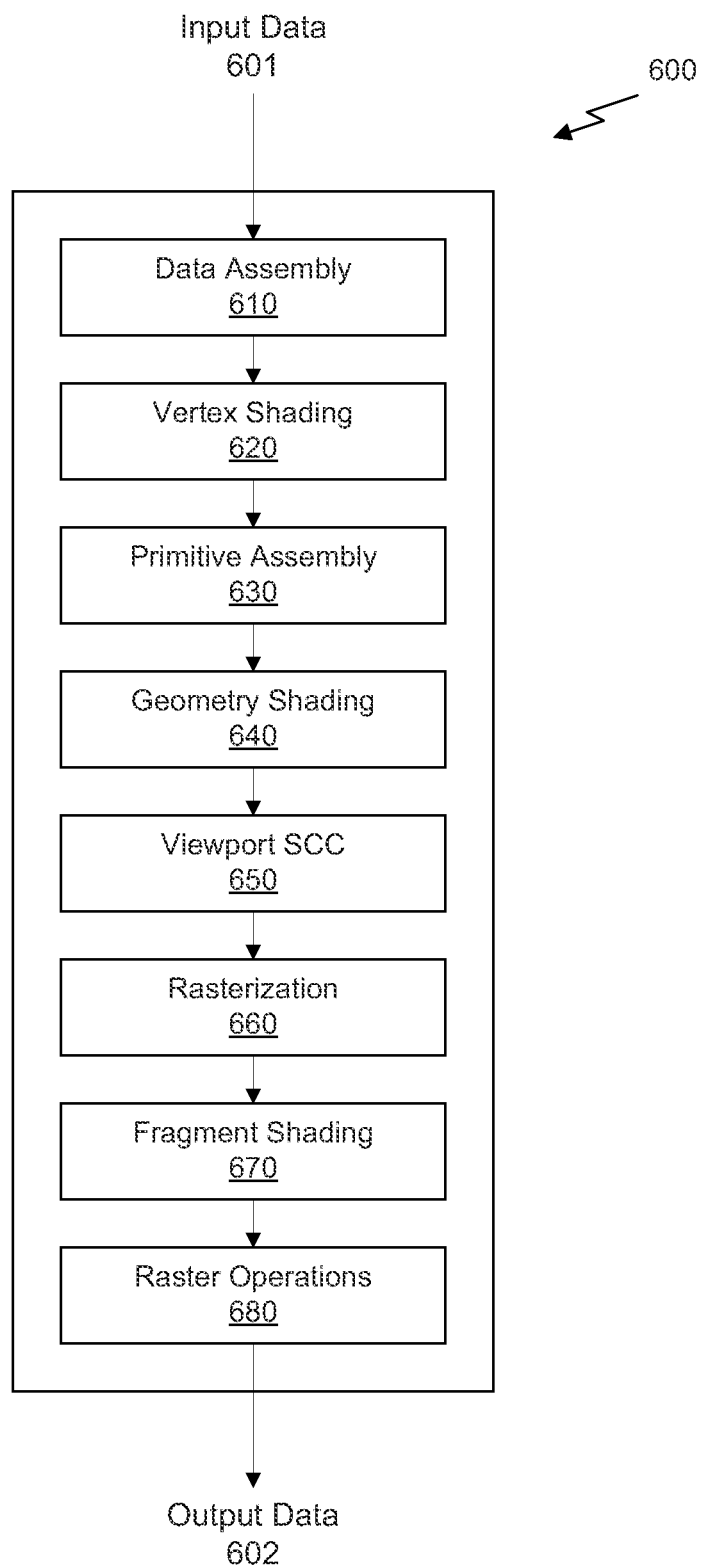
FIG. 6 is a conceptual diagram of a graphics processing pipeline implemented by the parallel processing unit of FIG. 4, in accordance with one embodiment.

FIG. 6 is a conceptual diagram of a graphics processing pipeline 600 implemented by the PPU 400 of FIG. 4, in accordance with one embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In one embodiment, the graphics processing pipeline 600 may represent a graphics processing pipeline defined by the OpenGL® API.

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In one embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (i.e., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (i.e., a vertex shader or a program) once for each of the vertices. Vertices may be, e.g., specified as a 4-coordinate vector associated with one or more vertex attributes. The vertex shading stage 620 may manipulate properties such as position, color, texture coordinates, and the like. In other words, the vertex shading stage 620 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (i.e., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (i.e., a collection of associated vertices) to the geometry shading stage 640.

The geometry shading stage 640 processes geometric primitives by performing a set of operations (i.e., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on depth of the viewing frustum. All potentially visible geometric primitives are then transmitted to the rasterization stage 660.

The rasterization stage 660 converts the 3D geometric primitives into 2D fragments. The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample location for the pixel intercept the geometric primitive. In one embodiment, z-testing may also be performed to determine if the geometric primitive is occluded by other geometric primitives that have already been rasterized. The rasterization stage 660 generates fragment data (i.e., interpolated vertex attributes associated with a particular sample location for each covered pixel) that are transmitted to the fragment shading stage 670.

The fragment shading stage 670 processes fragment data by performing a set of operations (i.e., a fragment shader or a program) on each of the fragments. The fragment shading stage 670 may generate pixel data (i.e., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (i.e., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 400. Other stages of the graphics processing pipeline 600 may be implemented by programmable hardware units such as the SM 450 of the PPU 400.

Unlike GPGPU programs, where a single kernel is launched on the GPU 306, initiating hundreds or thousands of threads, graphics programs are implemented by launching an initial kernel on the GPU 306 that, in turn, launches one or more subsequent kernels without intervention by the CPU 301. For example, a graphics program may launch a kernel on the GPU 306 to perform the vertex shading stage 620 on one SM 450 (or multiple SMs 450). That kernel then launches a separate kernel to perform the geometry shading stage 640, which in turn launches another kernel to perform the fragment shading stage 670, and so forth. In addition, some of the other stages of the graphics processing pipeline 600 may be implemented on fixed unit hardware such as a rasterizer or a data assembler. It will be appreciated that results from one kernel may be processed by one or more intervening fixed function hardware units before being processed by a subsequent kernel on an SM 450. Consequently, unlike GPGPU programs, which may be potentially restored by loading a saved state into one of the SMs 450 and re-launching the halted kernel, graphics programs are much harder to re-load because many fixed function units do not allow for a saved state to be reloaded. The replay mechanism described above alleviates this issue.

FIG. 7A illustrates a portion of code for a shader program 700, in accordance with one embodiment. As shown in FIG. 7A, the shader program 700 is a vertex shader programmed in a high-level shader language such as NVIDIA® Cg (C for Graphics). The shader program 700 is a portion of code developed for rendering a tessellated geometry. It will be appreciated that the code for the shader program 700 is for illustrative purposes only and that any shader program code may be debugged using the techniques described herein.

As described above, the data assembly stage 610 receives a list of geometric primitives from the graphics application 334. The API context is configured to set the state of the PPU 400 to implement at least a portion of the graphics processing pipeline 600. Once the API context is setup, another API command may launch tasks on the PPU 200. The tasks may comprise a plurality of threads configured to implement, e.g., a shader program. Each thread in the plurality of threads represents a single instance of the shader program 700. As vertices are transmitted from the data assembly stage 610 to the vertex shading stage 620, the scheduler unit 520 allocates the vertices to an available thread.

Figure 7B:
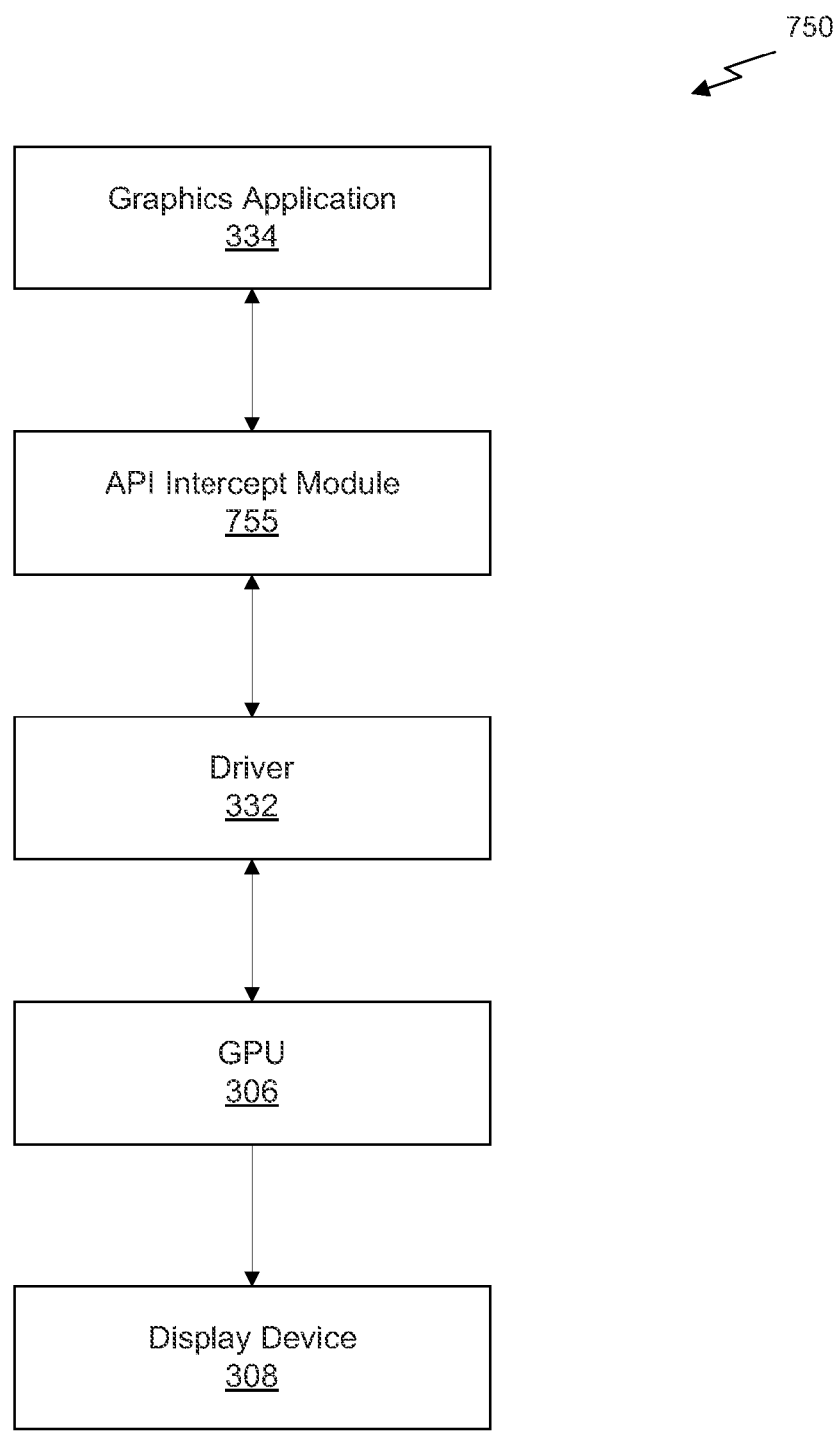
FIG. 7B illustrates a system for debugging a shader program using a single graphics processing unit, in accordance with another embodiment.

FIG. 7B illustrates a system 750 for debugging a shader program 335 using a single GPU 306, in accordance with another embodiment. As shown in FIG. 7B, the system 750 includes a graphics application 334, an API interception module 755, a driver 332, a GPU 306, and a display device 308. The graphics application 334, the API interception module 755, and the driver 332 are executed by the CPU 301. In order to debug source code for the shader program 335, the source code may be compiled by a compiler and stored in a memory that is accessible by the GPU 306. The graphics application 334 generates a stream of API commands that includes at least one command that loads the shader program 335 on an SM 450 of the PPU 400 and launches a number of threads on the SM 450, each thread being an instance of the shader program 335. The API interception module 755 is configured to intercept the stream of API commands generated by the graphics application 334. The API interception module 755 tracks the state of the API context by managing a state model that is configured to emulate the changing state of the API context in response to the stream of API commands. The API interception module 755 forwards the stream of API commands to the driver 332. Again, in some embodiments, the stream of API commands may be forwarded to one or more intermediate software layers such as a runtime library that implements the Direct3D® API. The driver 332 then translates the API commands into instructions or commands that are sent to the GPU 306 to perform various operations that generate image data for display on the display device 308.

To begin debugging the source code 335 for the graphics program, the IDE 333 may transmit a command to the API interception module 755. At the start of the next frame, the API interception module 755 may store an initial state of the API context. Then, the API interception module 755 stores the stream of API commands generated by the graphics application 334 for one or more frames in a replay buffer. Once a stream of API commands has been stored in the replay buffer, the API interception module 755 then initiates a replay loop until the GPU 306 encounters a breakpoint. Again, the breakpoint is a special instruction inserted into the compiled shader program 335 code by the IDE 333. When the breakpoint is executed by the GPU 306, a fault handler is executed that causes the API interception module 755 to store the current state of the GPU context out to the shadow state memory 336. It will be appreciated that storing the current state of the GPU context comprises copying the information related to the state model, including parameters, register values, and shared memory, into the shadow state memory 336. In one embodiment, the GPU context includes information about the currently active threads, register values, local memory values, buffers stored in global memory, and so forth. Once the current state of the GPU context is saved to the shadow state memory 336, the threads on the GPU 306 may be allowed to finish executing. The GPU 306 may then be freed to process a different context. Consequently, the display device 308 is allowed to generate new image data for display so that the display device 308 is not frozen on the previous frame or turned off because the display device 308 stops receiving video signals.

Returning to FIG. 7A, the API interception module 755 enables various debugging functionality to be implemented using a system with a single GPU 306. For example, the programmer can use the IDE 333 to insert a breakpoint into the source code of the shader program 335. The programmer can select a specific line of the source code and insert a breakpoint using a command implemented by the IDE 333. Once the programmer has specified a breakpoint, the programmer can select a command within the IDE 333 to compile and execute a current version of the source code for the shader program 335. In one embodiment, the breakpoint may be inserted into an already compiled version of the shader program 335 using binary patching techniques (i.e., replacing instructions in the shader program to jump to a set of instructions including a breakpoint). The graphics application 334 may be executed, which generates a stream of API commands to be transmitted to a software layer such as the driver 332. The API commands create an API context in order to render a frame of video data. The stream of API commands causes the modified shader program 335 to be executed by the GPU 306.

Once the first breakpoint is reached, a fault handler is executed in the GPU 306 and the instructions of the fault handler cause the API interception module 755 to save the state of the GPU context to the shadow state memory 336. The GPU 306 is then allowed to continue execution of the threads until the frame has been rendered. The programmer can then examine the state of the GPU context saved in the shadow state memory 336 using the graphical user interface (GUI)

implemented by the IDE 333. Once the programmer has examined the state of the GPU 306 at the first breakpoint, the programmer can repeat this process, setting a different breakpoint in the source code for the shader program 335.

Another debugging mechanism that can be implemented using the replay mechanism is instruction stepping. It will be appreciated that stepping to the next instruction or next breakpoint is not as easy as simply executing the next pending instruction for a thread or group of threads because the GPU 306 cannot be halted for a period of time while waiting for the programmer to indicate that the program should continue executing without freezing the image displayed on the display device 308. Therefore, the replay functionality enabled by the API interception module 755 may be utilized to repeatedly execute the stream of API commands, halting execution at different points in the program, storing the current state of the GPU context at a different point during each iteration of the replay loop, and displaying the stored state of the GPU context while the GPU 306 is allowed to continue executing.

In one embodiment, the API interception module 755 is configured to restore the initial state of the API context during each pass of the replay loop. Once the initial state of the API context has been restored, the API interception module 755 may transmit the stream of API commands stored in the replay buffer to the software layer, which causes the GPU 306 to re-render the one or more frames. For instruction stepping between breakpoints, the API interception module 755 may track a list of breakpoints that have already been encountered. Each breakpoint may be associated with a particular API command (e.g., a third draw call) as well as a particular line number in the shader program 335. The breakpoint may also be associated with other state such as a particular primitive (e.g., vertex, triangle, fragment, etc.), a particular frame, etc. As the GPU 306 executes a breakpoint, the fault handler causes the API interception module 755 to evaluate the particular breakpoint that caused the fault and determine whether the program should be allowed to continue or whether the current breakpoint is the next breakpoint in sequential order that should be displayed to the programmer. The next breakpoint may represent a single step from the previous instruction.

In this manner, the program is being stepped through instruction by instruction or breakpoint by breakpoint. However, in reality, the full frame (or frames) is being re-rendered each time the replay loop is processed and the API interception module 755 is simply attempting to capture the state of the GPU context at different points in the rendering process. The reality is that the exact order of execution by the GPU 306 may not be the same during each pass of the replay loop. In other words, while the stream of API commands has a constant order, the architecture of the GPU 306 may schedule execution of particular threads in different order based on various scheduling algorithms such that the order of execution of threads may not be exactly the same during different iterations of the replay loop but the state for a particular thread of interest may be restored exactly compared to previous iterations of the replay loop. However, by continuing to step through the instructions and inspecting the state of the GPU context during each step, the program appears to be executed sequentially and the programmer can identify potential bugs in the source code similar to conventional debugging tools.

It will be appreciated that in certain architectures, a particular shader program 335 may be executed substantially in parallel for hundreds or thousands of threads. Thus, a single breakpoint in a shader program 335 may be reached during one clock cycle for a particular group of threads (i.e., a warp), while that same breakpoint may be reached during one or more additional clock cycles for different groups of threads that are instances of the same shader program 335. For example, a fragment shader may be executed one or more times for each pixel in an image, where a 1080p HD image has over 2 million pixels. The GPU 306 can process only a portion of those threads during any given clock cycle. Therefore, a single breakpoint in the shader program 335 may be reached a number of times for a group of related threads. In one embodiment, the API interception module 755 tracks the number of times the current pass of the replay loop has encountered a particular breakpoint. In other words, the API interception module 755 may keep a counter that indicates how many times the breakpoint has been hit during a particular debugging session. Then during a particular pass of the replay loop, the API interception module 755 will track how many times that particular breakpoint has triggered the fault handler. If the breakpoint has not been encountered a threshold number of times during that particular pass of the replay loop, then the API interception module 755 allows the GPU 306 to continue execution. However, if the breakpoint has been encountered the threshold number of times during that particular pass of the replay loop, then the API interception module 755 causes the current state of the GPU context to be stored to the shadow state memory 336. This type of operation provides the illusion of progress to the execution of the shader program 335, even when there is only a single breakpoint included in the shader program 335.

In other words, stopping at the first breakpoint in a shader program executed by hundreds or thousands of threads in parallel would always stop the rendering at a particular point near the beginning of the frame. The illusion of progress is provided by automatically skipping a number of breakpoints during each iteration of the replay loop to advance to a different point in the rendering of the frame.

Figure 8A:
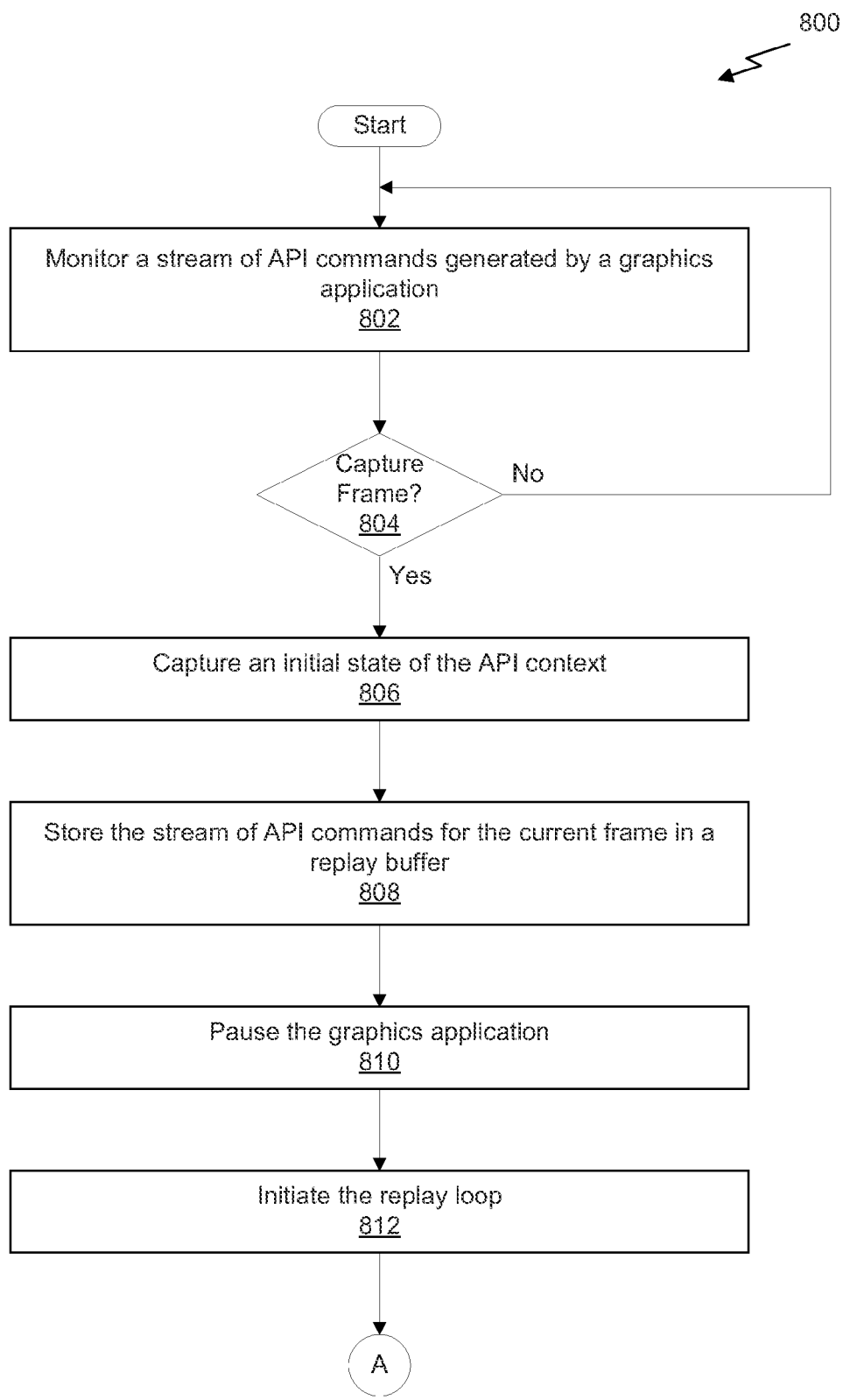
FIGS. 8A, 8B, & 8C illustrate a flowchart of a method for debugging graphics programs with a single graphics processing unit, in accordance with another embodiment.
Figure 8B:
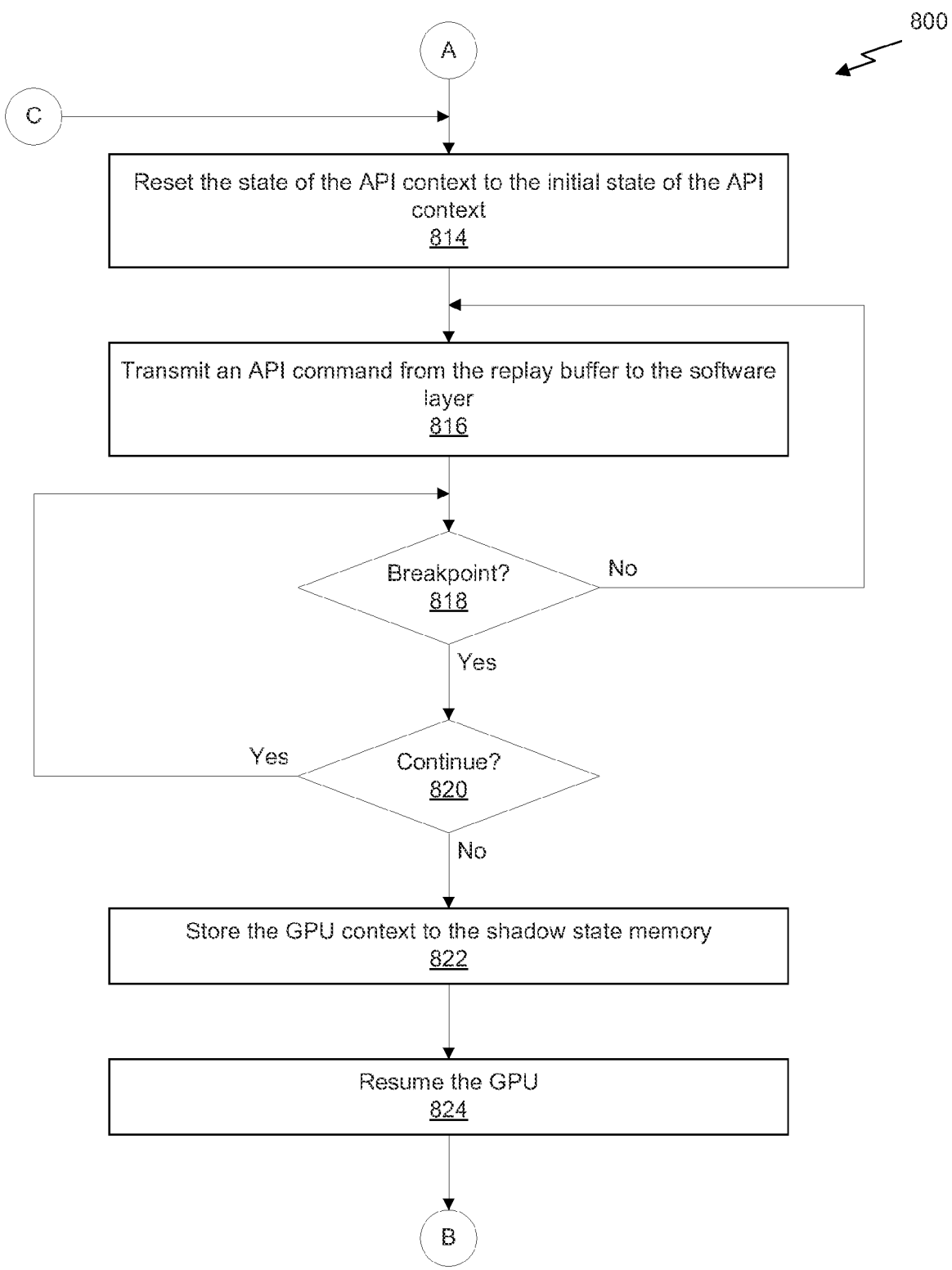
Figure 8C:
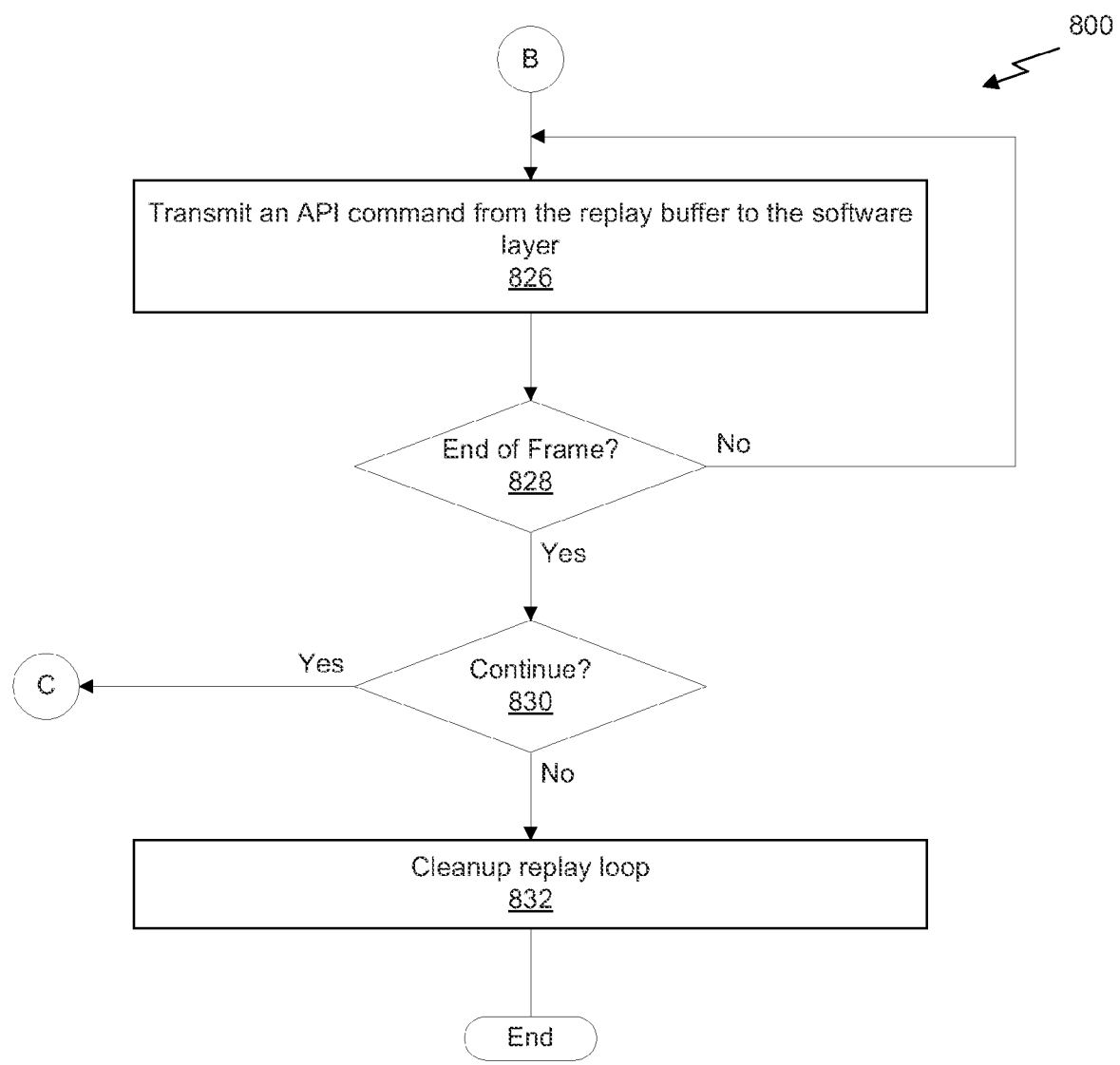

FIGS. 8A, 8B, & 8C illustrate a flowchart of a method 800 for debugging graphics programs with a single GPU 306, in accordance with another embodiment. At step 802, an API interception module 755 monitors a stream of API commands generated by a graphics application 334. In one embodiment, the API interception module 755 is an application shim that is configured to intercept API commands generated by a graphics application 334 and manage a state model that represents an API context associated with the graphics application 334. At step 804, the API interception module 755 determines whether to capture the next frame. In one embodiment, the API interception module 755 may be configured to receive a command from the IDE 333 that causes the API interception module 755 to capture the stream of API commands for the next frame. In another embodiment, the API interception module 755 may be configured to capture a frame automatically when a first breakpoint is set in a shader program 335 and configured to not capture a frame automatically when all breakpoints are removed from the shader program 335. If the API interception module 755 has not received an instruction to capture the next frame, then the API interception module 755 continues to monitor the stream of API commands generated by the graphics application 334. However, if the API interception module 755 has received an instruction to capture the next frame, then, at step 806, the API interception module 755 captures an initial state of the API context. In one embodiment, the API interception module 755 creates a copy of the state model at the start of the next frame in the memory 304.

At step 808, the API interception module 755 stores a stream of API commands for the current frame in a replay buffer. The replay buffer is a data structure in the memory 304 that maintains an ordered list of the API commands for at least one frame. At step 810, the API interception module 755 may pause the execution of the graphics application 334. It will be appreciated that certain processes may be halted in today's modern operating systems. At step 812, the API interception module 755 initiates a replay loop. Each pass of the replay loop will reset the API context to the initial state of the API context captured in step 806 and re-transmit the stream of API commands stored in the replay buffer to the software layer to re-render the frame one or more times.

At step 814, the API interception module 755 resets the state of the API context to the initial state of the API context. In one embodiment, the API interception module 755 may be configured to generate a new API context that represents the initial state of the API context that is saved in the memory 304. The new API context can be generated by issuing new API commands that include parameters that are related to the initial state of the API context. In another embodiment, the API interception module 755 is configured to generate API commands that modify the current API context in order to reset the initial state of the API context. It will be appreciated that the API interception module 755 may also be configured to reset the state of objects (e.g., buffers, textures, etc.) in the memory 304 based on the initial state of the API context.

At step 816, the API interception module 755 transmits an API command from the stream of API commands stored in the replay buffer to a software layer. Again, the software layer may be a driver or runtime library that implements the API. At step 818, the API interception module 755 determines whether a breakpoint has been reached. In one embodiment, the GPU 306 executes a fault handler when a breakpoint is reached that causes a message to be transmitted to the driver 332. The driver 332 may inform the API interception module 755 that a breakpoint has caused the GPU 306 to halt execution of the graphics program and the API interception module 755 can perform various operations related to the breakpoint. If a breakpoint has not been reached, then the method 800 returns to step 816 where the next API command in the replay buffer is transmitted to the software layer. However, if a breakpoint has been reached, then, at step 820, the API interception module 755 determines whether to continue execution. In one embodiment, the API interception module 755 determines whether the particular breakpoint that triggered the fault handler should cause the API interception module 755 to store the current state of the GPU context to the shadow state memory 336. For example, if the breakpoint has been reached before and the API interception module 755 is configured to provide the illusion of progress by waiting until later threads trigger the breakpoint, then the API interception module 755 allows the GPU to continue execution and the method returns to step 818 to wait for the next breakpoint. However, if execution should be stopped, then, at step 822, the GPU context is stored to the shadow state memory 336. Once the GPU context is stored in the shadow state memory 336, at step 824, the GPU may be resumed and allowed to continue execution.

At step 826, the API interception module 755 transmits the next API command in the replay buffer to the software layer. At step 828, the API interception module 755 determines whether the end of the frame has been reached. A particular API command in the stream of API commands may indicate that the end of the frame has been reached. If the end of the frame has not been reached, then the method 800 returns to step 826 and transmits another API command to the software layer. However, if the end of the frame has been reached, then, at state 830, the API interception module 755 determines whether to continue with another pass of the replay loop. The API interception module 755 may wait for a command from a debugging tool that indicates a programmer wants to perform another pass and inspect the GPU context at a different point in the program. If the API interception module 755 determines that another pass of the replay loop should be made, then the method 800 returns to step 814 where the initial state of the API context is restored. However, if the API interception module 755 determines that the replay loop should be terminated, then, at step 832, the API interception module 755 cleans up the replay loop. In one embodiment, the API interception module 755 may deallocate memory used for the shadow state memory 336, the initial state of the API, and so forth. After step 832, the method 800 terminates.

Figure 9:
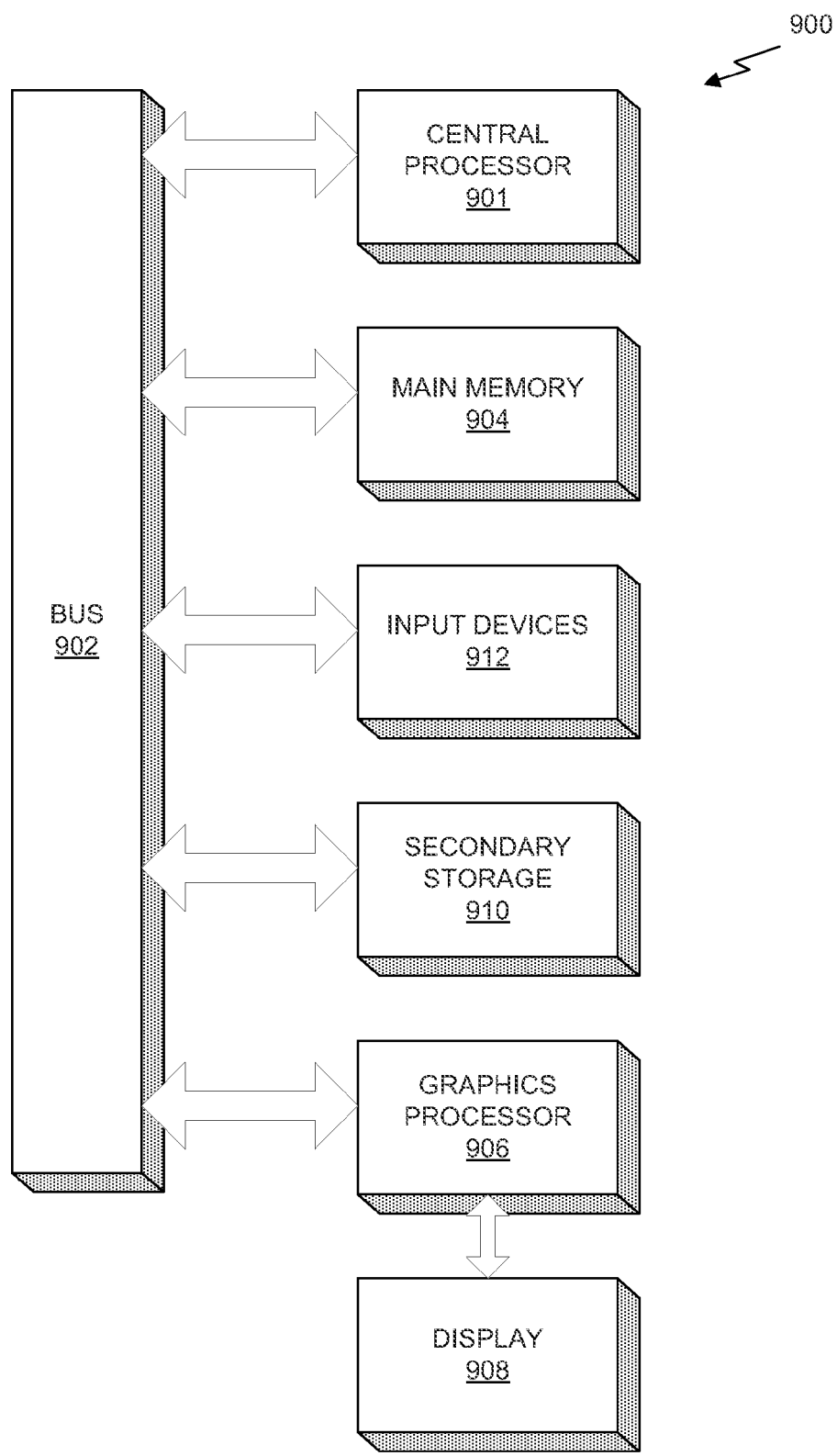
FIG. 9 illustrates an exemplary system in which the various architecture and/or functionality of the various previous embodiments may be implemented.

FIG. 9 illustrates an exemplary system 900 in which the various architecture and/or functionality of the various previous embodiments may be implemented. As shown, a system 900 is provided including at least one central processor 901 that is connected to a communication bus 902. The communication bus 902 may be implemented using any suitable protocol, such as PCI (Peripheral Component Interconnect), PCI-Express, AGP (Accelerated Graphics Port), HyperTransport, or any other bus or point-to-point communication protocol(s). The system 900 also includes a main memory 904. Control logic (software) and data are stored in the main memory 904 which may take the form of random access memory (RAM).

The system 900 also includes input devices 912, a graphics processor 906, and a display 908, i.e. a conventional CRT (cathode ray tube), LCD (liquid crystal display), LED (light emitting diode), plasma display or the like. User input may be received from the input devices 912, e.g., keyboard, mouse, touchpad, microphone, and the like. In one embodiment, the graphics processor 906 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 900 may also include a secondary storage 910. The secondary storage 910 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 904 and/or the secondary storage 910. Such computer programs, when executed, enable the system 900 to perform various functions. The memory 904, the storage 910, and/or any other storage are possible examples of computer-readable media.

In one embodiment, the architecture and/or functionality of the various previous figures may be implemented in the context of the central processor 901, the graphics processor 906, an integrated circuit (not shown) that is capable of at least a portion of the capabilities of both the central processor 901 and the graphics processor 906, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 900 may take the form of a desktop computer, laptop computer, server, workstation, game consoles, embedded system, and/or any other type of logic. Still yet, the system 900 may take the form of various other devices including, but not limited to a personal digital assistant (PDA) device, a mobile phone device, a television, etc.

Further, while not shown, the system 900 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
   storing an initial state of an application programming interface (API) context in a memory, wherein the initial state of the API context corresponds to the start of a frame;
   intercepting a stream of API commands associated with the frame, wherein the stream of API commands are generated by a graphics application;
   storing the intercepted stream of API commands;
   transmitting the intercepted stream of API commands to a software layer that implements the API to render the frame;
   initiating a replay loop to re-render the frame, including restoring a current API context to match the initial state of the API context and transmitting the stored stream of API commands to the software layer;
   during the replay loop, performing instruction stepping between breakpoints including in response to a breakpoint encountered during the transmitting of the stored stream of API commands to the software layer:
   (a) determining whether the breakpoint has already been encountered,
   (b) when it is determined that the breakpoint has already been encountered,
      (1) continuing the transmitting of the stored stream of API commands to the software layer until a next breakpoint is encountered and then repeating (a), and
   (c) when it is determined that the breakpoint has not already been encountered,
      (1) storing a graphics processing unit (GPU) context in the memory,
      (2) after storing the GPU context in the memory, continuing the transmitting of the stored stream of API commands to the software layer until the next breakpoint is encountered and then repeating (a).

2. The method of claim 1, wherein the replay loop is repeated in response to a command received from an integrated development environment (IDE).

3. The method of claim 1, wherein the software layer is a driver.

4. The method of claim 3, wherein the driver implements an OpenGL® API.

5. The method of claim 1, wherein the software layer is a runtime library.

6. The method of claim 5, wherein the runtime library implements a Direct3D® API.

7. The method of claim 1, further comprising tracking the state of the API context.

8. The method of claim 7, wherein tracking the state of the API context comprises:
   initiating a state model associated with the graphics application; and
   for each API command generated by the graphics application, updating the state model based on the API command.

9. The method of claim 1, wherein the stream of API commands is intercepted by an application shim.

10. The method of claim 1, wherein the initial state of the API context represents a state of the GPU associated with the API context at the beginning of the frame.

11. A non-transitory computer-readable storage medium storing instructions that, when executed by a processor, cause the processor to perform steps comprising:
    storing an initial state of an application programming interface (API) context in a memory, wherein the initial state of the API context corresponds to the start of a frame;
    intercepting a stream of API commands associated with the frame, wherein the stream of API commands are generated by a graphics application;
    storing the intercepted stream of API commands;
    transmitting the intercepted stream of API commands to a software layer that implements the API to render the frame;
    initiating a replay loop to re-render the frame, including restoring a current API context to match the initial state of the API context and transmitting the stored stream of API commands to the software layer;
    during the replay loop, performing instruction stepping between breakpoints including in response to a breakpoint encountered during the transmitting of the stored stream of API commands to the software layer:
    (a) determining whether the breakpoint has already been encountered,
    (b) when it is determined that the breakpoint has already been encountered,
       (1) continuing the transmitting of the stored stream of API commands to the software layer until a next breakpoint is encountered and then repeating (a), and
    (c) when it is determined that the breakpoint has not already been encountered,
       (1) storing a graphics processing unit (GPU) context in the memory,
       (2) after storing the GPU context in the memory, continuing the transmitting of the stored stream of API commands to the software layer until the next breakpoint is encountered and then repeating (a).

12. The non-transitory computer-readable storage medium of claim 11, wherein the software layer is a driver.

13. The non-transitory computer-readable storage medium of claim 11, the steps further comprising tracking the state of the API context by:
    initiating a state model associated with the graphics application; and
    for each API command generated by the graphics application, updating the state model based on the API command.

14. A system, comprising:
a graphics processing unit (GPU);
a memory configured to store an application shim, the application shim being configured to:
store an initial state of an application programming interface (API) context in a memory, wherein the initial state of the API context corresponds to the start of a frame;
intercept a stream of API commands associated with the frame, wherein the stream of API commands are generated by a graphics application;
store the intercepted stream of API commands;
transmit the intercepted stream of API commands to a software layer that implements the API to render the frame;
initiate a replay loop to re-render the frame, including restoring a current API context to match the initial state of the API context and transmitting the stored stream of API commands to the software layer;
during the replay loop, perform instruction stepping between breakpoints including in response to a breakpoint encountered during the transmitting of the stored stream of API commands to the software layer:
 (a) determining whether the breakpoint has already been encountered,
 (b) when it is determined that the breakpoint has already been encountered,
  (1) continuing the transmitting of the stored stream of API commands to the software layer until a next breakpoint is encountered and then repeating (a), and
 (c) when it is determined that the breakpoint has not already been encountered,
  (1) storing GPU context in the memory,
  (2) after storing the GPU context in the memory, continuing the transmitting of the stored stream of API commands to the software layer until the next breakpoint is encountered and then repeating (a).

15. The system of claim 14, wherein the graphics application is associated with one or more shader programs configured to be executed by the GPU.

16. The system of claim 14, wherein the software layer comprises a driver that implements an OpenGL API.

17. The system of claim 14, the application shim further configured to track a state of the API context by:
initiating a state model associated with the graphics application; and
for each API command generated by the graphics application, updating the state model based on the API command.

* * * * *